United States Patent
Dumant et al.

(10) Patent No.: US 10,460,277 B2
(45) Date of Patent: Oct. 29, 2019

(54) BUSINESS INTELLIGENCE LANGUAGE MACROS

(71) Applicant: Business Objects Software Limited, Dublin (IE)

(72) Inventors: Bruno Dumant, Verneuil sur Seine (FR); Xavier Vanderschaeghe, Chaville (FR); Olivier Hamon, Levallois Perret (FR)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 464 days.

(21) Appl. No.: 15/378,381

(22) Filed: Dec. 14, 2016

(65) Prior Publication Data

US 2018/0165610 A1    Jun. 14, 2018

(51) Int. Cl.
*G06Q 10/06* (2012.01)
*G06N 5/02* (2006.01)
*G06F 17/27* (2006.01)
*G06F 17/28* (2006.01)

(52) U.S. Cl.
CPC ....... *G06Q 10/067* (2013.01); *G06F 17/2785* (2013.01); *G06F 17/2836* (2013.01); *G06N 5/022* (2013.01)

(58) Field of Classification Search
CPC .. G06F 16/245; G06F 16/211; G06F 16/2453; G06F 16/288; G06F 16/243; G06F 16/24535; G06F 8/34; G06Q 10/067; G06N 5/022

USPC ........ 707/E17.005, 714, 803, 802, E17.056, 707/790, 791; 705/348
See application file for complete search history.

(56) References Cited

U.S. PATENT DOCUMENTS

| | | | |
|---|---|---|---|
| 2008/0263436 A1* | 10/2008 | Ahrens | G06F 9/5055 715/234 |
| 2011/0295837 A1* | 12/2011 | Bolsius | G06F 16/245 707/714 |
| 2011/0295870 A1* | 12/2011 | Bolsius | G06F 16/243 707/765 |

* cited by examiner

*Primary Examiner* — Robert W Beausoliel, Jr.
*Assistant Examiner* — Pedro J Santos
(74) *Attorney, Agent, or Firm* — Buckley, Maschoff & Talwalkar LLC

(57) ABSTRACT

According to some embodiments, a business intelligence language expansion and compilation platform may receive a business intelligence language expression, containing at least one macro sub-expression from a user. Information may then be accessed in a business and data models data store to perform expansion and compilation operations on the received business intelligence language expression. As a result of these operations, the system may provide a native query to a data source database. A business intelligence language result set manager may retrieve data from a data source database responsive to the native query and output a business intelligence language result set to the user in response to the business intelligence language expression. According to some embodiments, the business intelligence language is reentrant such that the received business intelligence language expression is evaluated in one context and uses a result of another business intelligence language expression evaluated in a possibly different context.

20 Claims, 11 Drawing Sheets

```
700 ─┐
{
  "name": "Ratio",
  "params": {
    "divisor" : { "kind" : "entity" },     ─ 710
    "dividend" : { "kind" : "entity" }
  },
  "expression": { "type": "call", "funct": "IF_THEN", "args": [   ─ 720
    { "type": "call", "funct": "!=", "args": [
      { "type": "macroPlaceholder", "name": "divisor" },
      0
    ]},
    { "type": "call", "funct": "/", "args": [                      ─ 730
      { "type": "macroPlaceholder", "name": "dividend" },
      { "type": "macroPlaceholder", "name": "divisor" }
    ]}
  ]}
}
```

FIG. 7

```
800 ─┐
{ "type": "struct",
  "topology": { "r": { "a": true } },
  "dictionary": {
      ┌─────────────────────── 810
      "m": { "type": "bo", "ref": "Revenue" },
      "a": { "type": "bo", "ref": "Customer" },
      "r": { "type": "macro", "macro": "com.sap.sbi.macros.Ratio", "args": {  ── 820
          "dividend": { "type": "ref", "ref": [ "m" ] },
          "divisor":  { "type": "ref", "ref": [ "m" ] }, "kind": "absolute" }
      }
  }
},
{ "type": "struct",
  "topology": { "r": { "a": true } },
  "dictionary": {
      "m": { "type": "bo", "ref": "Revenue" },  ── 830
      "a": { "type": "bo", "ref": "Product" },
      "r": { "type": "macro", "macro": "com.sap.sbi.macros.Ratio", "args": {  ── 840
          "dividend": { "type": "ref", "ref": [ "m" ] },
          "divisor":  { "type": "ref", "ref": [ "m" ] }, "kind": "absolute" }
      }
  }
}
```

FIG. 8

```
900 ─┐
{
  "name" : "YoYGrowth",
  "version" : "1.0",
  "params" : {
    "measure" : { "kind" : "entity" },
    "#date comment" : "Date dimension",
    "date" : { "kind" : "entity" }
  },
  "expression": { "type": "macro", "macro": " com.sap.sbi.macros.Growth", "args": {   ─ 920
    "current": { "type": "macroPlaceHolder", "name": "value" },                      ─ 910
    "previous": { "type": "macro", "macro": "com.sap.sbi.macros.time.pop.YoY",
      "args": {
        "measure": { "type": "macroPlaceHolder", "name": "measure" },
        "date": { "type": "macroPlaceHolder", "name": "date" }
      }
    }
  }
}
```

FIG. 9

BUSINESS INTELLIGENCE LANGUAGE MACROS

FIELD

Some embodiments are associated with a business intelligence language for an enterprise. In particular, some embodiments describe business intelligence language macros.

BACKGROUND

In some cases, a user might want to receive business information about an enterprise. For example, a user might want to create a query to view and/or analyze information from an enterprise data store about the enterprise's revenue or profit in accordance with various regions, time periods, products, etc. Query languages, such as the Structured Query Language ("SQL"), may be particularly suited for retrieval of data from data stores, regardless of the schema of the data. However, SQL may not be particularly suited to data analysis, as it lacks the expressiveness to specify complex, high-level calculations. For example, SQL may provide calculation of only one table at a time and lack constructs such as calculated members, join abstraction, and the abstraction of aggregation functions.

In contrast, Multi-Dimensional eXpressions ("MDX") is a language providing more meaningful multi-dimensional analytical queries including calculated measures, calculated members, hierarchical navigation support, and heterogeneous member sets. MDX is therefore commonly used to provide advanced analysis.

MDX, however, requires an underlying multi-dimensional model (i.e., an information Cube) which must be authored so as to conform to particular structural requirements. Typically, an information Cube represents a set of independent coordinates in an N-dimensional space, each point of which contains a scalar value (i.e., a string or numeral). MDX allows programmers to specify sets of coordinates in this space and to retrieve the values corresponding to the coordinates.

Authoring a Cube on top of, for instance, a transactional data model of an application can be a relatively costly design task which forces designers to make compromises. For example, a designer may typically determine a default hierarchy to navigate each dimension of a Cube. Also, all dimensions in a Cube must be orthogonal, and, as a result, relations that exist between dimensions in the original schema may be lost after the original schema is projected onto a Cube schema.

Note that data analysis often requires the specification of complex pieces of data, such as an entire report or a dashboard, that can only be materialized in a complex database schema containing, for instance, multiple fact tables sharing some but not all dimension tables. However, SQL, MDX, and other existing query languages for query and analysis are limited in regards to the "shape" of the data sets that a query can return. An SQL SELECT statement, however complex, always computes a single table. Similarly, an MDX statement always brings back a "cube slice" or star schema that includes only one fact table with foreign keys to zero or more independent dimension tables.

Therefore, if a report or dashboard requires more than the above-described simple data topologies, multiple queries to the underlying system must be issued. Then, the client application must reconcile the data returned by the multiple queries, which may involve additional data processing. Consequently, the atomicity of the read transaction is not guaranteed. In addition, the creation and understanding of queries in such approaches can be a difficult and error-prone task that requires specialized training and experience to be successful.

Describing complex data topologies may rapidly become very difficult and lead to large and intricate expressions. It may therefore be desirable to provide systems and methods to facilitate the use of business intelligence language macro expressions in an intuitive and flexible manner. These macro expressions may play the same role as functions in conventional programming languages, making it possible to reuse repeated computations. As a result, the definition and maintenance of complex expressions may be made easier.

SUMMARY OF THE INVENTION

According to some embodiments, systems, methods, apparatus, computer program code and means are provided to facilitate the use of business intelligence language macro expressions in an intuitive and flexible manner. In some embodiments, a business intelligence language expansion and compilation platform may receive a business intelligence language expression, containing at least one macro sub-expression, from a user. Information may then be accessed in a business and data models data store to perform expansion and compilation operations on the received business intelligence language expression. As a result of these operations, the system may provide a native query to a data source database. A business intelligence language result set manager may retrieve data from a data source database responsive to the native query and output a business intelligence language result set to the user in response to the business intelligence language expression. According to some embodiments, the business intelligence language is reentrant such that the received business intelligence language expression is evaluated in one context and uses a result of another business intelligence language expression evaluated in a possibly different context.

Some embodiments comprise: means for receiving, from a user at a business intelligence language expansion and compilation platform, a business intelligence language, containing at least one macro sub-expression; means for accessing, by the business intelligence language expansion and compilation platform, mapping information in a business and data models data store to perform expansion and compilation operations on the received business intelligence language expression, the mapping information associating semantic layer information with data foundation model information; means for as a result of said operations, providing a native query to a data source database from the business intelligence language expansion and compilation platform; means for retrieving, by a business intelligence language result set manager, data from the data source database responsive to the native query; and means for outputting a business intelligence language result set to the user in response to the business intelligence language expression.

In some embodiments, a communication device associated with a back-end application computer server exchanges information with remote user devices. The information may be exchanged, for example, via public and/or proprietary communication networks.

Technical effects of some embodiments of the invention are improved and computerized ways to facilitate the use of business intelligence language macro expressions in an intuitive and flexible manner. With these and other advan-

BRIEF DESCRIPTION OF THE DRAWINGS

FIG. 7 is a business intelligence language ratio macro example according to some embodiments.

FIG. 8 illustrates a business intelligence language usage example in accordance with some embodiments.

FIG. 9 illustrates a business intelligence language macro combination according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Some embodiments described herein are directed to a Business Intelligence Language ("BIL") system. The BIL system might leverage concepts present in the Data Specification Language ("DaSL") as described in U.S. Pat. No. 8,572,122, the contents of which are incorporated by reference herein for all purposes. BIL and/or DaSL may, for example, let a business user create powerful and flexible queries of an underlying data source.

Figure 1:
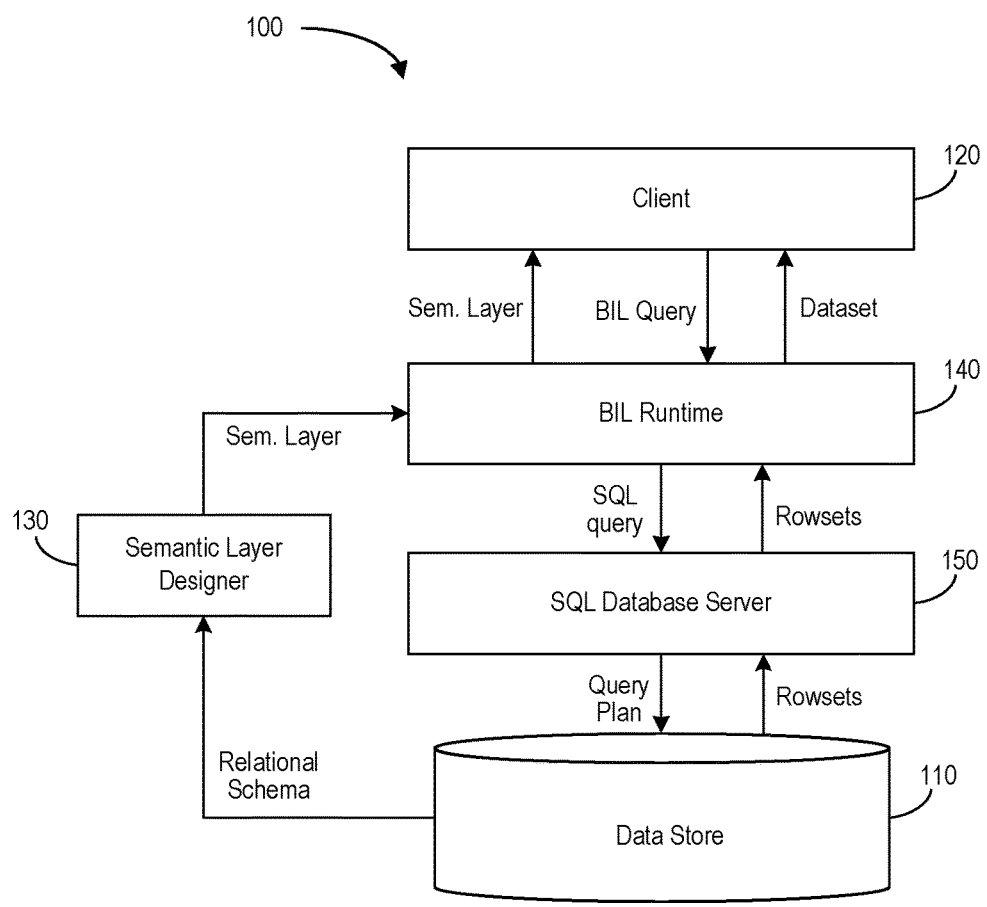
FIG. 1 is block diagram of a system.

FIG. 1 is a block diagram of system 100 as is known in the art. The system 100 may operate to provide data from data store 110 to client 120, and is described herein to provide contrast with the operation of some embodiments. As illustrated, semantic layer designer 130 determines the relational schema of data stored in data store 110. Semantic layer designer 130 maps logical entities of the relational schema to a set of abstract entities known as business objects. The business objects and their mappings comprise a semantic layer, which is defined in metadata of BIL runtime 140. The BIL runtime 140 may use semantic layer information and the data foundation (or data model) to translate a BIL query into native queries and to process the results. Note that BIL runtime 140 may correspond to elements 520, 530, 540 of FIG. 5.

The business objects may represent business entities, such as customers, time periods, financial figures, etc. Business objects may be classified as dimensions along which one may want to perform an analysis or report (e.g., Year, Country, Product), details (additional information on dimensions, e.g., Address of a Customer or Description of a Product), and measures (e.g., Sales, Profit) whose values can be determined for a given combination of dimension values.

Client 120 comprises a computing device executing a front-end software application providing reporting, planning and/or analytics. Client 120 receives the semantic layer and generates business intelligence language queries based on the business objects of the semantic layer. Note that in some cases, a client may have no knowledge of the semantic layer and instead let the backend generate appropriate queries. This might be the case, for example, in smart BI where a client simply issues a near-natural query to the backend. The semantic layer therefore facilitates the retrieval of data from data store 110 without requiring reference to specific physical entities (tables, rows, etc.) of data store 110.

The BIL runtime 140 receives a BIL query from client 120 and creates a calculation plan based on the mappings which bind the semantic layer to the logical entities of the relational schema of data store 110 (sometimes named data foundation or data model). The calculation plan mixes local computations with zero, one, or more SQL queries. These queries may depend on each other, in the sense that a given query can use information provided as the result of another query. The calculation plan defines in which order local computations and SQL queries should be executed (or if they can be executed in parallel). The BIL runtime 140 sends each SQL query to the SQL database server 150 and performs local computations according to the calculation plan. SQL database server 150 receives the corresponding SQL queries and, based on its knowledge of the relational schema and its underlying physical entities, creates query plans to be executed by data store 110. The data store 110 executes the query plans and returns corresponding rowsets (i.e., data) to the BIL runtime 140. Once the calculation plan is completely executed, the BIL runtime 140 formats the included data based on the semantic layer, and provides the thusly-formatted dataset to client 120.

Embodiments are not limited to relational schemas as described in the example of system 100. The schema of the underlying data store could be relational, multi-dimensional or another type, and a Data Schema may be generated therefrom for use by an adapter, compiler and client as described above. In this regard, element 130 provide BIL runtime 140 with metadata binding the Data Schema to logical entities of the underlying logical schema of data store 110; this element might not be required if the bindings are otherwise available to the BIL runtime 140. If the data store 110 is not a SQL data store, another query language (instead of SQL queries) may be used as appropriate.

As used herein, the term "BIL" may refer to, for example, a Business Intelligence ("BI") query representation model that can be easily be authored directly or indirectly by programmers who are not BI or database experts. Moreover, a BIL system may refer to business objects, types, functions and/or entities exposed by a knowledge graph and may specify arbitrarily simple or complex business questions that combine these BI entities. According to some embodiments, a BIL system may provide all required information explicitly without needing to rely on default or convention-based interpretations. Further, some embodiments may not require technical understanding of the data sources and their nature by a user (e.g., the use of database specific terms may be avoided) and may also be independent from the number and nature of the underlying data-source(s). Embodiments may target expressiveness while offering less abstract and granular constructs as compared to DaSL. Further, some embodiments may be compiled efficiently to a sufficient abstract relational plan.

According to some embodiments, a BIL system may compute arbitrary result set topologies such that BIL queries form a recursively nested structure of "bodies" attached to "axes" (which may allow for various topologies). A BIL system may also provide conceptual sparsity such that BIL is based on a relatively small number of primitive concepts that are re-used systematically. Some embodiments may avoid syntactic sugar and redundancy (e.g., "helpers," if any, may be added with caution and be identified as such). A BIL system may also provide re-entrance/orthogonality such that BIL is a fully recursive representation. According to some embodiments, any BIL entity can be used as a parameter for any BIL primitive or operation. The semantics of a BIL operator may be independent both from its parameters and from its syntactic context. Note that BIL may compute arbitrarily nested sub-queries as a core mechanism.

As used herein, the phrase "BIL query" may refer to, for example, a top-level artifact that specifies a business question. A BIL query may be considered "stand-alone" in the sense that it contains all the information necessary to uniquely define the semantics of a query. However, in itself the query might not contain the technical metadata needed to generate a physical query: this metadata can either be passed from the client inside a nesting payload (of which BIL is just a component), or acquired separately by a query service.

A BIL query may be called a "BIL expression" because the details of how an answer to a business question is computed might not matter to an author. What might matter instead is that a business question is asked and a business answer is returned. The actual answer computation may involve physical queries being issued to one or several data sources, and may also involve local calculations within the query service (or even in the client). A BIL expression may be a recursive structure, and may contain nested BIL expressions (which are composed using various operations). A BIL query may then be considered a top-level, outermost BIL expression that must be computed.

A BIL expression itself may be a declarative, recursive structure that specifies the business question to be answered. The semantic information may be precise and explicit. This expression might be, for example, serialized as a Java Script Object Notation ("JSON") structure. According to some embodiments, the JSON structure may be associated with an open-standard format that uses human-readable text to transmit data objects consisting of attribute-value pairs. In this case, the basic JSON data types are: (i) Number: a signed decimal number that may contain a fractional part and may use exponential E notation, but cannot include non-numbers; (ii) String: a sequence of zero or more Unicode characters delimited with double-quotation marks; (iii) Boolean: either of the values "true" or "false;" (iv) Array: an ordered list of zero or more values, each of which may be of any type (note that arrays may use square bracket notation with elements being comma-separated); (v) Object: an unordered collection of name/value pairs where the names (also called keys) are strings; and (vi) null: an empty value, using the word null.

The result of an evaluation of a BIL expression is called a BIL entity. The BIL entity is the answer to the business question specified by the BIL expression. Conversely, a BIL expression is also called a BIL entity definition. The output type or shape of a BIL expression may specify the schema of the corresponding BIL entity. The output type can be deduced from the definition even before (or without) computing the actual data. A client tool can obtain the output type of a BIL expression and use it, for instance, to bind views or controls on certain columns. The result set of a BIL expression may be a representation of the corresponding BIL entity. The result set may be computed when the BIL query is run and may comprise a set of tuple-sets of which the signatures match the query's output type (it may be obtained, for example, as a set of JSON flows).

According to some embodiments, a BIL entity generalizes the notion of entity set in Entity Relationship ("ER") model or tuple set in relational algebra. Similar to an entity that has named attributes or a table that has named columns, a BIL entity may have named properties (also sometimes referred to as attributes). Note however, that a property of a BIL entity is itself an arbitrary entity, so BI entities can be arbitrarily nested. An atomic entity is a value of a primitive type like a string or number, which doesn't nest any property; any other entity is a structured entity. In a "flat" entity, like a traditional entity set or SQL table, all properties are atomic entities. It is possible, for example, to flatten any entity into a tuple collection. Many operations in BIL may use flat entities, which are implicitly obtained from an entity through flattening.

The BIL entity may also generalize the notion of "key." In relational algebra or in the ER model, a tuple set or entity set usually has a unique key, a subset of its columns for which a value determine a unique value for each of the other columns, called dependent columns. A BIL entity also has a set of key properties, usually called axes, and a set of dependent properties called bodies. But in addition, a BIL Entity may specify an arbitrary number of functional dependencies or partial key constraints, also called axis attachments. Each body property may be attached to a subset of the entity's axes. Each value of a (body) property is determined by a specific combination of values for the axis properties to which it is attached. This makes it possible for an entity to represent heterogeneous data sets, for instance a table alongside with a summary value, or a cross table with additional information about its lines and columns, using a simple, systematic and re-entrant model. An entity or tuple set may be described by a type or signature, which specifies the names and data types of its attributes or columns. The output type of a BIL entity generalizes this notion: the output type specifies the names of this entity's properties, the axis attachment relationships between them, and (recursively) the output type of each nested structured component.

The Result Set of a BIL expression may be a stand-alone, self-described JSON structure that represents the entity data. According to some embodiments, there are three ways of returning this data: (1) the system may materialize the result set as a relational schema, where each axis attachment maps to a table with a foreign key to each of its (nesting) axes; (2) the system may create a recursively nested structure, in a more OLAP fashion, where the data for each nested "body" entity is given for each combination of values for the axes that drive it; or (3) the system may return a single flattened, de-normalized result set.

Figure 2:
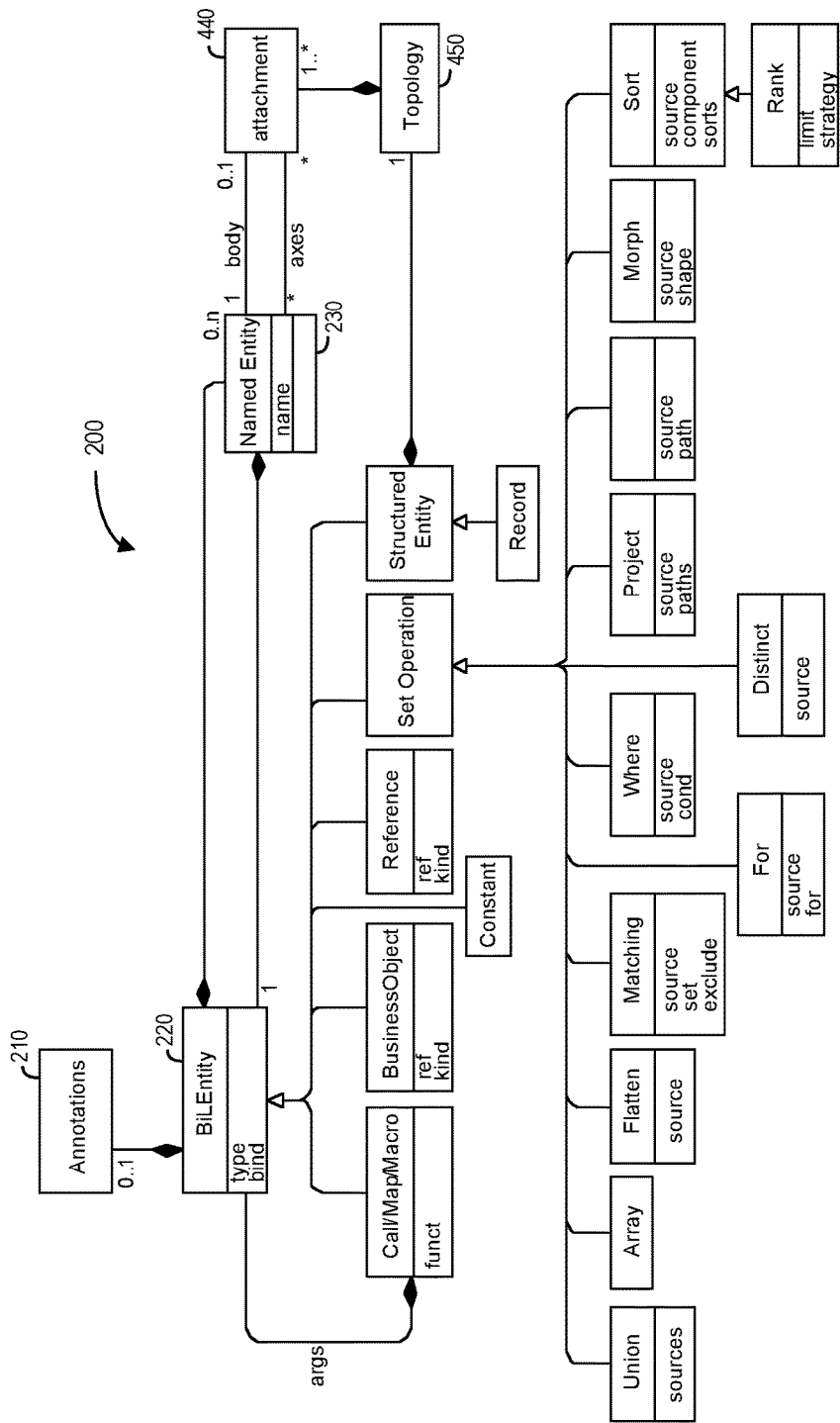
FIG. 2 is a system diagram summarizing structures and types of business intelligence language expressions in accordance with some embodiments.

FIG. 2 is a system diagram 200 summarizing structures and types of business intelligence language expressions in accordance with some embodiments. In particular, the diagram 200 illustrates BIL expression associations with annotations 210, a BIL entity 220, named entity 230, attachment 240, topology, etc. Note that a BIL expression might comprise a recursive JSON structure. The BIL expression may specify (in a general case) a dependency graph (e.g., a Directed Acyclic Graph ("DAG")) of BIL expressions, that are combined through various operations to finally produce a top-level BI entity. Note that a BI expression may specify an operation to be applied on zero or more other BIL entities.

Moreover, a BI expression may specify a type property, which represents the operation performed to obtain the BIL entity, such as:

```
{
    "type": "call",
    //...
}
```

Further note that other properties of a BIL expression, specific to the associated type, may also be required.

According to some embodiments, a BIL expression has a map of nested expressions, each associated to a locally unique name. A nested expression can appear as a component in the expression's topology, and may also be used for calculations defined inside the expression. It may, for example, be necessary to give a name to an expression that is computed several times (possibly in different contexts) to produce the resulting entity. Nested expressions of an expression may be declared using a reserved property dictionary. The dictionary property may, for example, contain a map of named nested expressions. All expressions defined in the dictionary of an expression might be referred using the appropriate full or partial qualified name.

Figure 3:
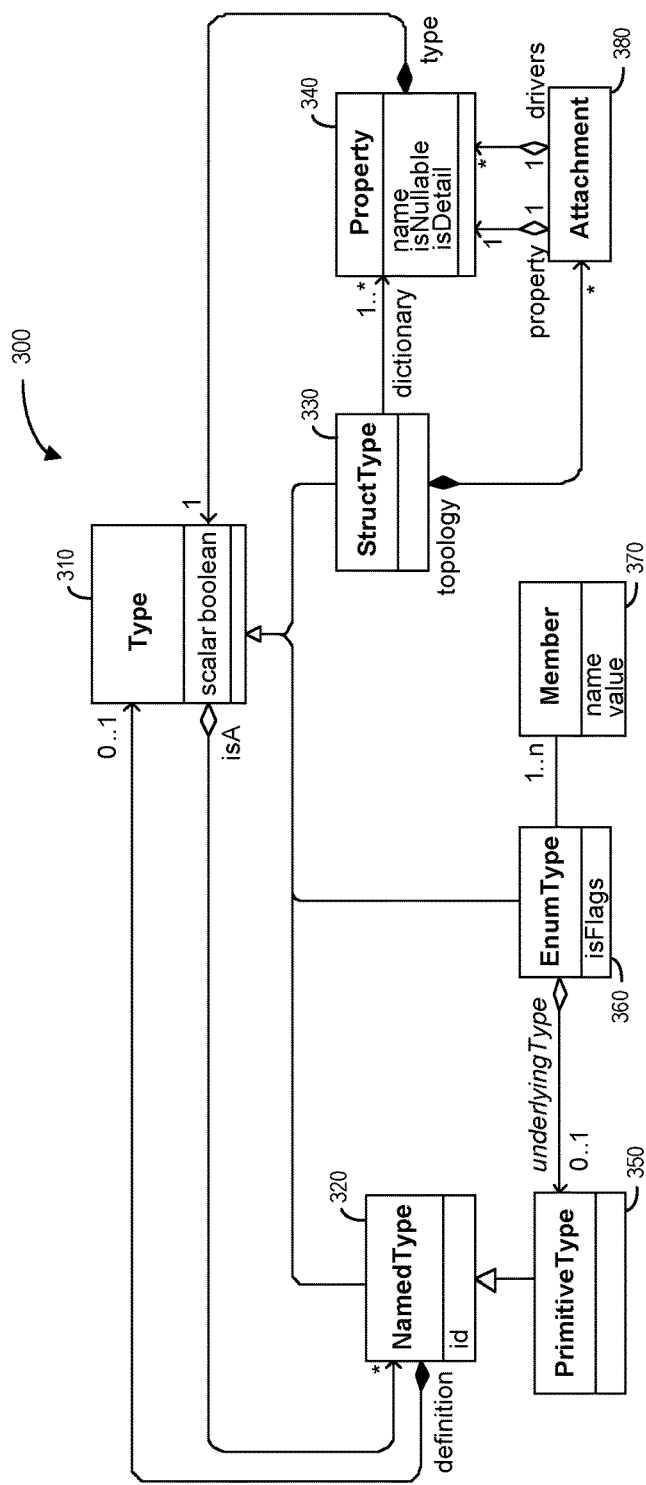
FIG. 3 is system diagram representing business intelligence language expression output types according to some embodiments.

Note that an output type of a BIL expression may describe the structure of a corresponding entity (that is, the structure of the information it represents). For example, FIG. 3 is system diagram 300 representing business intelligence language expression output types according to some embodiments. The diagram 300 illustrates relationships between an output type 310, named type 3230, structure type 330 (e.g., containing information about functional dependencies between properties), property 340, primitive type 350 (e.g., Boolean, date, number, integer, string, etc.), enumerated type 360, member 370, attachments 380 (e.g., associated with drivers that are a collection of properties of a defined structure type), etc. Note that the output type 310 might be associated with scalar (e.g., when "scalar" equals false, each instance of the type is a collection of objects of the corresponding scalar type) or isA (all properties of a super-type may also be properties of the derived type), etc.

According to some embodiments, a macro function may be used to facilitate building complex queries. Note that to completely leverage such a capability, a way of encapsulating subqueries and reuse may be implemented. As used herein, the term "macro" may refer to, for example, a rule or pattern that specifies how a certain input sequence (often a sequence of characters) should be mapped to a replacement output sequence (also often a sequence of characters) according to a defined procedure. The mapping process that instantiates (transforms) a macro use into a specific sequence is known as macro "expansion." Macros may, for example, make a sequence of computing instructions available to a programmer as a single program statement, making the programming task less tedious and less error-prone. Specifically, an objective of "macros" is to encapsulate possibly parameterized BIL expressions to let the user express needs in a natural fashion, in particular when the effective calculation involves technical axes. Available macro definitions may be stored in a knowledge graph as JSON expressions. A macro definition may specify, for example, a name of the macro (used for search and display purposes); named parameters to be provided, if any, and the associated kind; a BIL expression, extended with the term "macroPlaceholder" (e.g., pseudo-expressions that will be replaced by the parameter values at runtime).

For instance, the following JSON could be used as the definition of the macro "Ratio":

```
{
    "name": "Ratio",
    "params": {
        "divisor" : { "kind" : "entity" },
        "dividend" : { "kind" : "entity" }
    },
    "expression": { "type": "call", "funct": "IF_THEN", "args": [
        { "type": "call", "funct": "!=", "args": [
            { "type": "macroPlaceholder", "name": "divisor" },
            0
        ]},
        { "type": "call", "funct": "/", "args": [
            { "type": "macroPlaceholder", "name": "dividend" },
            { "type": "macroPlaceholder", "name": "divisor" }
        ]}
    ]}
}
```

Macros can be used, according to some embodiments, in a BIL expression by using expressions of type "macro." If a user wants to compute revenue ratio per customer, he or she might use the following expression:

```
{ "type": "struct",
    "topology": { "r": { "a": true } },
    "dictionary": {
        "r": { "type": "macro", "macro": "com.sap.sbi.macros.Ratio",
            "args": {
                "dividend": { "type": "ref", "ref": [ "revenue" ] },
                "divisor": { "type": "ref", "ref": [ "revenue" ], "kind": "absolute" }
            }
        },
        "a" : { "type": "bo", "ref": "Customer" },
        "revenue": { "type": "bo", "ref": "Revenue" }
    }
}
```

Note that the macro may be invoked by using its knowledge graph identifier, not its name. According to some embodiments, the name can be used to create captions. Note that macros do not necessarily need arguments. For instance, a user might define "myCustomers" as follows:

```
{
    "name": "myCustomers",
    "params": { },
    "expression": { "type": "matching",
        "source": { "type": "bo", "ref": "Customer" },
        "set": [ "Coca-Cola", "Pepsi" ]
    }
}
```

In this way, it may be possible to define synonyms in a relatively straightforward fashion.

Figure 4:
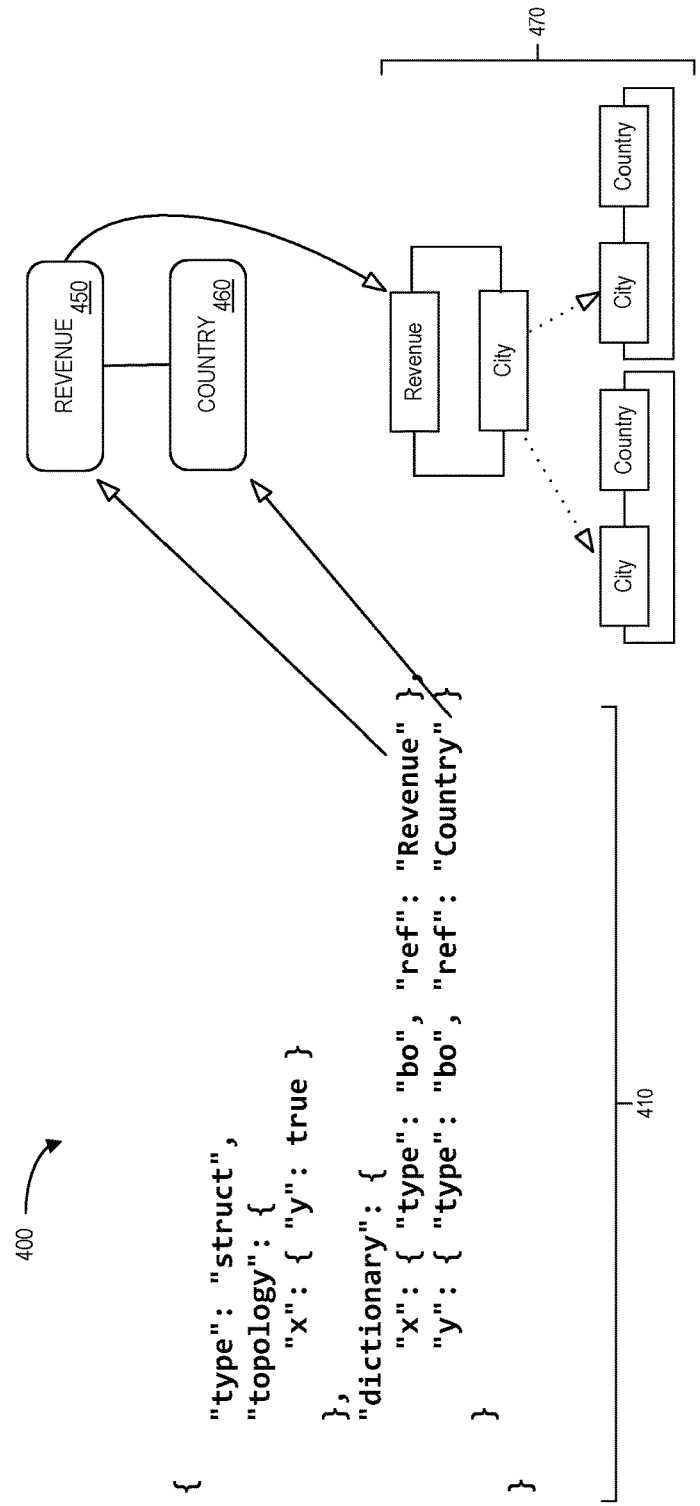
FIG. 4 is a business intelligence language example in accordance with some embodiments.

FIG. 4 is a business intelligence language example 400 in accordance with some embodiments. In particular, the example 400 includes macro instructions 410 that might be used to determine revenue by country for an enterprise. As can be seen, the dictionary entry for "Revenue" in the macro instructions 410 maps to Revenue 450 in the BI model (also known as the semantic layer). Similarly, the dictionary entry for "Country" in the macro instructions 410 maps to Country 460 in the BI model/semantic layer. Note that both the Revenue 450 and Country 460 map to data elements in a data model 470 (also known as the data foundation which might be associated with the relational schema of data store 110 described with respect to FIG. 1). In particular, the elements revenue might map to the element country via another element in the data model 470 (i.e., via the city data element as illustrated by dotted arrows in FIG. 4).

Figure 5:
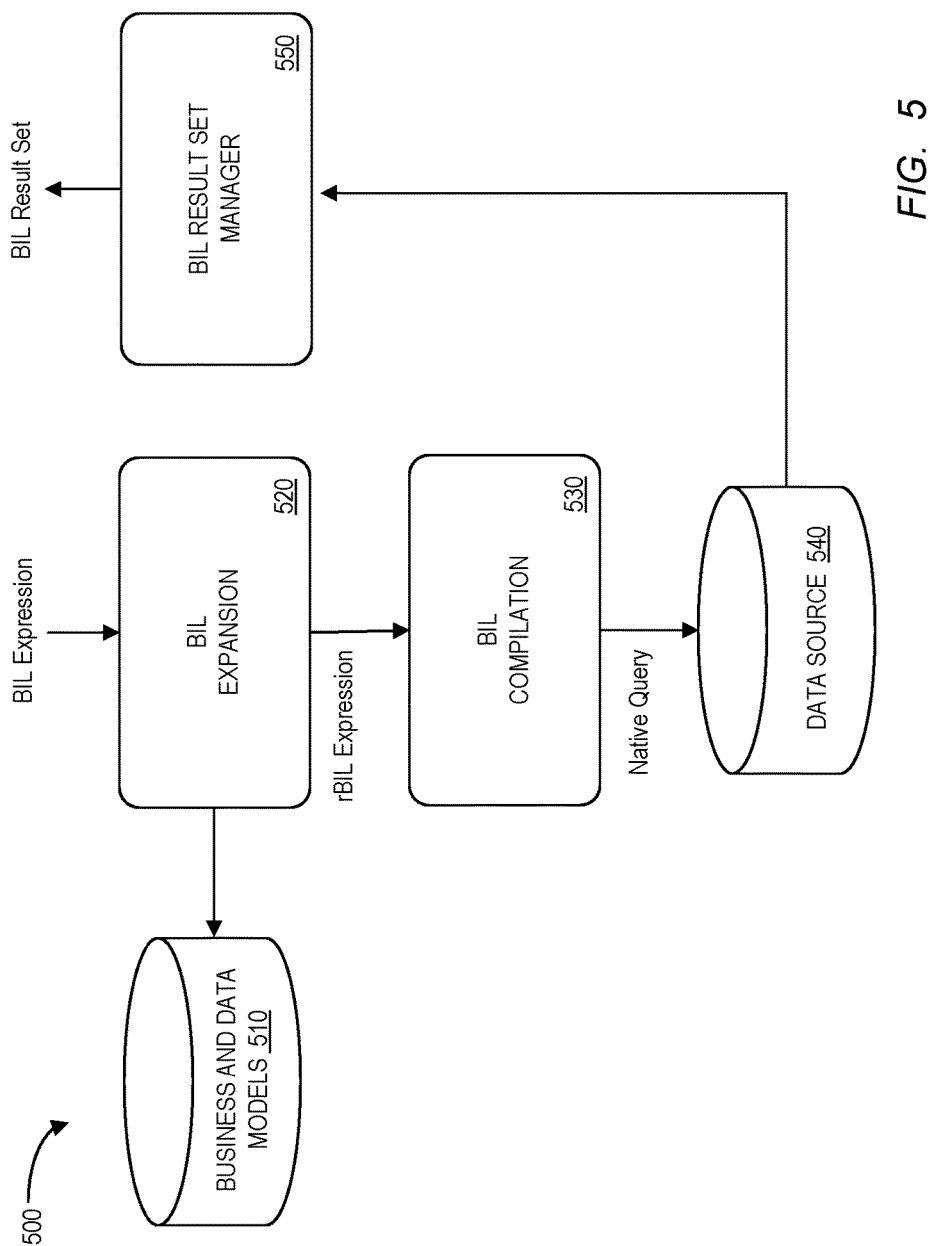
FIG. 5 is illustrates a business intelligence language execution flow according to some embodiments.

FIG. 5 is illustrates a business intelligence language execution flow 500 according to some embodiments. In particular, the execution flow 500 illustrates that a BIL expansion 520 may receive a BIL expression (e.g., generated or selected by a user) and access information in business and data models 510. A BIL compilation 530 may receive data from the BIL expansion 520 and provide a native query to a data source. A BIL result set manager 550 may access information from the data source 540 and provide a BIL result set (e.g., to the user in response to his or her query) to complete the execution flow 500. According to some embodiments, the business intelligence language expansion 520 and the business intelligence language compilation 530 (which might, for example, be implemented via a combined business intelligence language expansion and compilation platform) and the business intelligence language result set manager 550 may exchange information with a plurality of data source databases 540 in response to a received business intelligence language expression.

Figure 6:
FIG. 6 is a business intelligence language example in accordance with some embodiments.

FIG. 6 is a business intelligence language example 600 in accordance with some embodiments. The example 600 may, according to some embodiments, comprise instructions indicating how a "Ratio Revenue by Customer" might be expressed in BIL. As seen in FIG. 6, the dictionary portion of the instructions includes both an entry for "Revenue" 610 and an entry for "Customer" 620. Now consider, for example, a user who is interested in computing a ratio revenue by product, a ratio margin by year, etc. FIG. 7 is a business intelligence language ratio macro example 700 according to some embodiments. As can be seen, the macro example 700 calculates the ratio using a "divisor" entity and a "dividend" entity 710. Moreover, a "macroPlaceholder" name is used to calculate the dividend and/or divisor 720, 730 as appropriate.

Next, FIG. 8 illustrates a business intelligence language usage example 800 in accordance with some embodiments. A first portion 810 of the usage example 800 determines a revenue/customer ratio while a second portion 830, 840 of the usage example 800 determines a revenue/product ratio. Note that both portions 810, 830 call the macro example of FIG. 7 (as illustrated, for example, by the dividend and divisor dictionary entries 820 in the first portion 810). FIG. 9 illustrates a business intelligence language macro combination 900 according to some embodiments. In particular, the combination 900 illustrates how macros can be used within the definition of other macros. The combination 900 can be used for Year-Over-Year ("YOY") growth calculations. Note that the combination 900 combines a growth macro 910 and a Period-Over-Period ("POP") macro 920. Similar macros might be designed for quarter-over-quarter, month-over-month, week-over-week, etc. by replacing "Year" specific elements in the instructions of the combination 900.

Figure 10:
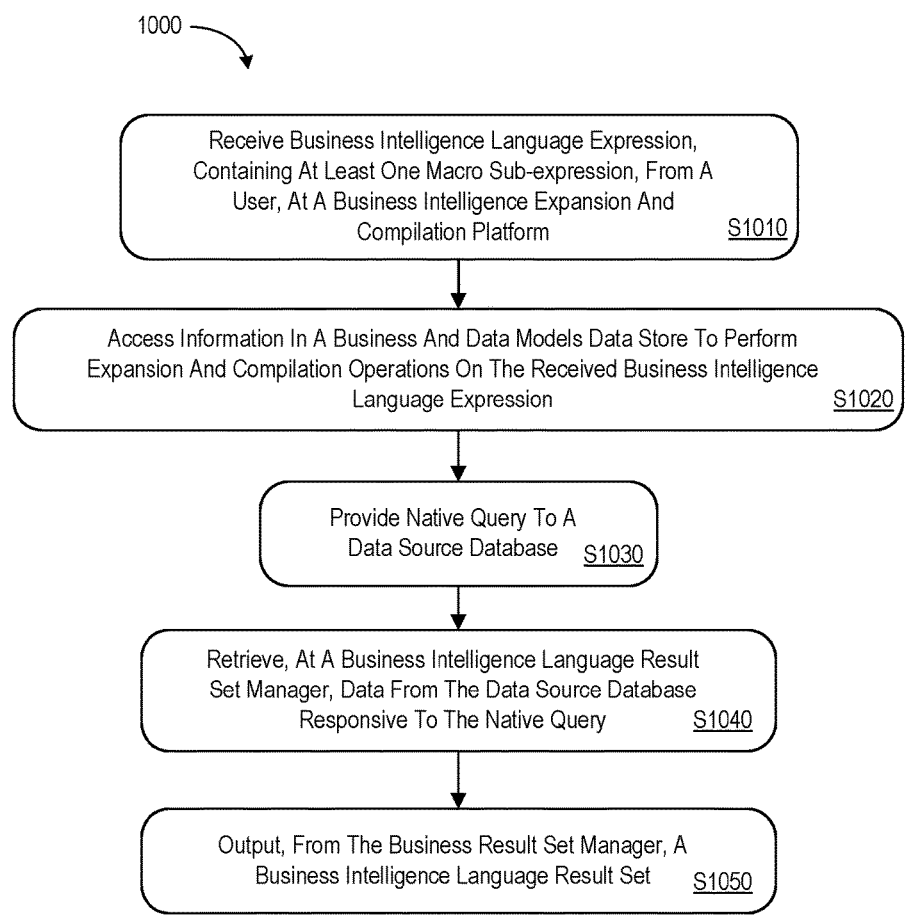
FIG. 10 illustrates a business intelligence language method in accordance with some embodiments.
Figure 11:
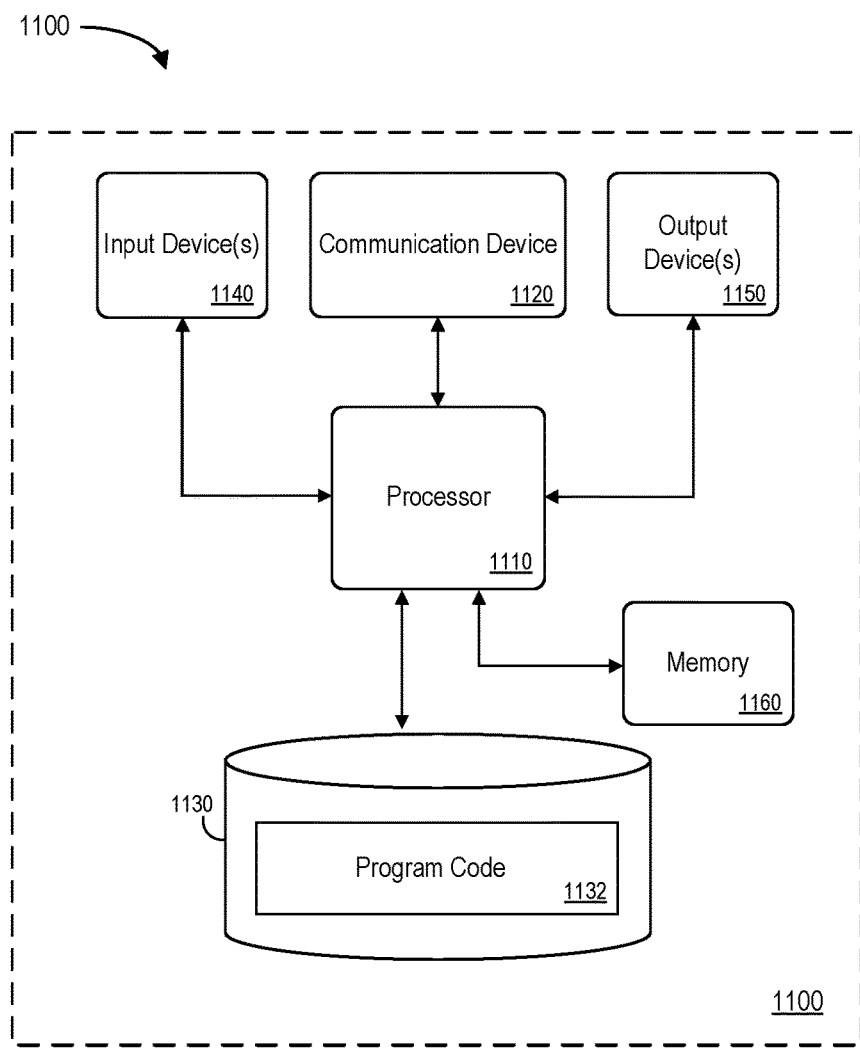
FIG. 11 is a high level diagram of an apparatus or platform in accordance with some embodiments.

FIG. 10 illustrates a method 1000 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S1010, the system may receive, from a user at a business intelligence language expansion and compilation platform, a business intelligence language expression, containing at least one macro sub-expression. According to some embodiments, the business intelligence language is reentrant such that the received business intelligence language expression is evaluated in a first context (e.g., an area of business intelligence of particular interest to a user) and uses a result of another business intelligence language expression evaluated in a second context, possibly different than the first context. That is, reentrance may correspond to the fact that an expression can be evaluated as an entity, which itself can be queried. Such a feature may help facilitate the manipulation of sub-expressions. Note that the received business intelligence language expression may be, for example, a function that receives at least one business intelligence language entity as a parameter and returns a business intelligence language result entity.

According to some embodiments, receiving the business language expression includes receiving, from the user, a selection of a macro expression from a library containing a set of potential macro expressions. For example, the selection might be associated with a dedicated macro expression GUI. The dedicated macro expression GUI could include a macro expression search ability (e.g., based on macro name, tags, keywords, input parameters, output parameters, dates, etc.) and/or a user question and answer mechanism (e.g., able to understand and respond to natural language inputs such as "how do I view a year-to-year productivity comparison between operating units?").

At S1020, the business intelligence language expansion and compilation platform may access information in a business and data models data store to perform expansion and compilation operations on the received business intelligence language expression. The business and data models data store may hold, for example, information mapping semantic layer information with data foundation model information. As a result of these operations, a native query may be provided at S1030 to a data source database from the business intelligence language expansion and compilation platform. The native query provided to the data source database might be, for example, associated with at least one encapsulated subquery. At S1040, a business intelligence language result set manager may receive data from the data source database responsive to the native query. At S1050, the system may output a business intelligence language result set to the user in response to the business intelligence language expression.

FIG. 13 is a block diagram of apparatus 1300 according to some embodiments. The apparatus 1300 may comprise a general-purpose computing apparatus and may execute program code to perform any of the functions described herein. The apparatus 1300 may include other unshown elements according to some embodiments.

According to some embodiments, the apparatus 1100 includes a processor 1110 operatively coupled to a communication device 1120, a data storage device 1130, one or more input devices 1140, one or more output devices 1150, and/or a memory 1160. The communication device 1120 may facilitate communication with external devices, such as a reporting client, or a data storage device. The input device(s) 1140 may comprise, for example, a keyboard, a keypad, a mouse or other pointing device, a microphone, knob or a switch, an Infra-Red ("IR") port, a docking station, and/or a touch screen. The input device(s) 1140 may be used, for example, to enter information into the apparatus 1100 (e.g., a search term used to locate a BIL macro). The output device(s) 1150 may comprise, for example, a display (e.g., a display screen) a speaker, and/or a printer (e.g., to provide BIL results to a user, summary reports, troubleshooting information, etc.).

The data storage device 1130 may comprise any appropriate persistent storage device, including combinations of magnetic storage devices (e.g., magnetic tape, hard disk drives and flash memory), optical storage devices, Read Only Memory ("ROM") devices, etc., while the memory 1160 may comprise Random Access Memory ("RAM").

The program code 1132 may be executed by the processor 1110 to cause the apparatus 1100 to perform any one or more of the processes described herein. Embodiments are not limited to execution of these processes by a single apparatus. The data storage device 1130 may also store data and other program code for providing additional functionality and/or which are necessary for operation thereof, such as device drivers, Operating System ("OS") files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of the discussed architectures may include a processor to execute program code such that the computing device operates as described herein.

All systems and processes discussed herein may be embodied in program code stored on one or more non-transitory tangible computer-readable media. Such media may include, for example, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A business intelligence language system, comprising:
   (a) a business and data models data store mapping semantic layer information with data foundation model information;
   (b) a data source database;
   (c) a business intelligence language expansion and compilation platform, coupled to the business and data models data store and to the data source database, configured to:
      (i) receive a business intelligence language expression, containing at least one macro sub-expression, from a user,
      (ii) access the mapping information in the business and data models data store to perform expansion and compilation operations on the received business intelligence language expression, and
      (iii) as a result of said operations, provide a native query to the data source database; and
   (d) a business intelligence language result set manager, coupled to the data source database, and configured to:
      (iv) retrieve data from the data source database responsive to the native query, and
      (v) output a business intelligence language result set to the user in response to the business intelligence language expression.

2. The system of claim 1, wherein the business intelligence language is reentrant such that the received business intelligence language expression is evaluated in a first context and uses a result of another business intelligence language expression evaluated in a second context, possibly different than the first context.

3. The system of claim 2, wherein the native query provided to the data source database is associated with at least one encapsulated subquery.

4. The system of claim 1, wherein the received business intelligence language expression is a function that receives at least one business intelligence language entity as a parameter and returns a business intelligence language result entity.

5. The system of claim 1, wherein receiving the business intelligence language expression comprises receiving, from the user, a selection of a macro expression from a library containing a set of potential macro expressions.

6. The system of claim 5, wherein the selection is associated with a dedicated macro expression graphical user interface.

7. The system of claim 6, wherein the dedicated macro expression graphical user interface includes at least one of (i) a macro expression search ability, and (ii) a user question and answer mechanism.

8. The system of claim 1, wherein the business intelligence language expansion and compilation platform and the business intelligence language result set manager exchange information with a plurality of data source databases in response to the received business intelligence language expression.

9. A computer-implemented business intelligence language method, comprising:
   receiving, from a user at a business intelligence language expansion and compilation platform, a business intelligence language expression, containing at least one macro sub-expression;
   accessing, by the business intelligence language expansion and compilation platform, mapping information in a business and data models data store to perform expansion and compilation operations on the received business intelligence language expression, the mapping information associating semantic layer information with data foundation model information;
   as a result of said operations, providing a native query to a data source database from the business intelligence language expansion and compilation platform;
   retrieving, by a business intelligence language result set manager, data from the data source database responsive to the native query; and
   outputting a business intelligence language result set to the user in response to the business intelligence language expression.

10. The method of claim 9, wherein the business intelligence language is reentrant such that the received business intelligence language expression is evaluated in a first context and uses a result of another business intelligence language expression evaluated in a second context, possibly different than the first context.

11. The method of claim 10, wherein the native query provided to the data source database is associated with at least one encapsulated subquery.

12. The method of claim 9, wherein the received business intelligence language expression is a function that receives at least one business intelligence language entity as a parameter and returns a business intelligence language result entity.

13. The method of claim 9, wherein said receiving the business intelligence language expression comprises receiving, from the user, a selection of a macro expression from a library containing a set of potential macro expressions.

14. The method of claim 13, wherein the selection is associated with a dedicated macro expression graphical user interface including at least one of (i) a macro expression search ability, and (ii) a user question and answer mechanism.

15. A non-transitory, computer-readable medium storing program code, the program code executable by a processor of a business intelligence language platform to cause the processor to:
receive, from a user at a business intelligence language expansion and compilation platform, a business intelligence language expression, including at least one macro sub-expression;
access, by the business intelligence language expansion and compilation platform, mapping information in a business and data models data store to perform expansion and compilation operations on the received business intelligence language expression, the mapping information associating semantic layer information with data foundation model information;
as a result of said operations, provide a native query to a data source database from the business intelligence language expansion and compilation platform;
retrieve, by a business intelligence language result set manager, data from the data source database responsive to the native query; and
output a business intelligence language result set to the user in response to the business intelligence language expression.

16. The medium of claim 15, wherein the business intelligence language is reentrant such that the received business intelligence language expression is evaluated in a first context and uses a result of another business intelligence language expression evaluated in a second context, possibly different than the first context.

17. The medium of claim 16, wherein the native query provided to the data source database is associated with at least one encapsulated subquery.

18. The medium of claim 15, wherein the received business intelligence language expression is a function that receives at least one business intelligence language entity as a parameter and returns a business intelligence language result entity.

19. The medium of claim 15, wherein said receiving the business intelligence language expression comprises receiving, from the user, a selection of a macro expression from a library containing a set of potential macro expressions.

20. The medium of claim 19, wherein the selection is associated with a dedicated macro expression graphical user interface including at least one of (i) a macro expression search ability, and (ii) a user question and answer mechanism.

* * * * *